Dec. 18, 1951  A. S. KROTZ ET AL  2,579,084
CONSTANT LEVEL VEHICLE SUSPENSION
Filed July 8, 1946  3 Sheets-Sheet 1
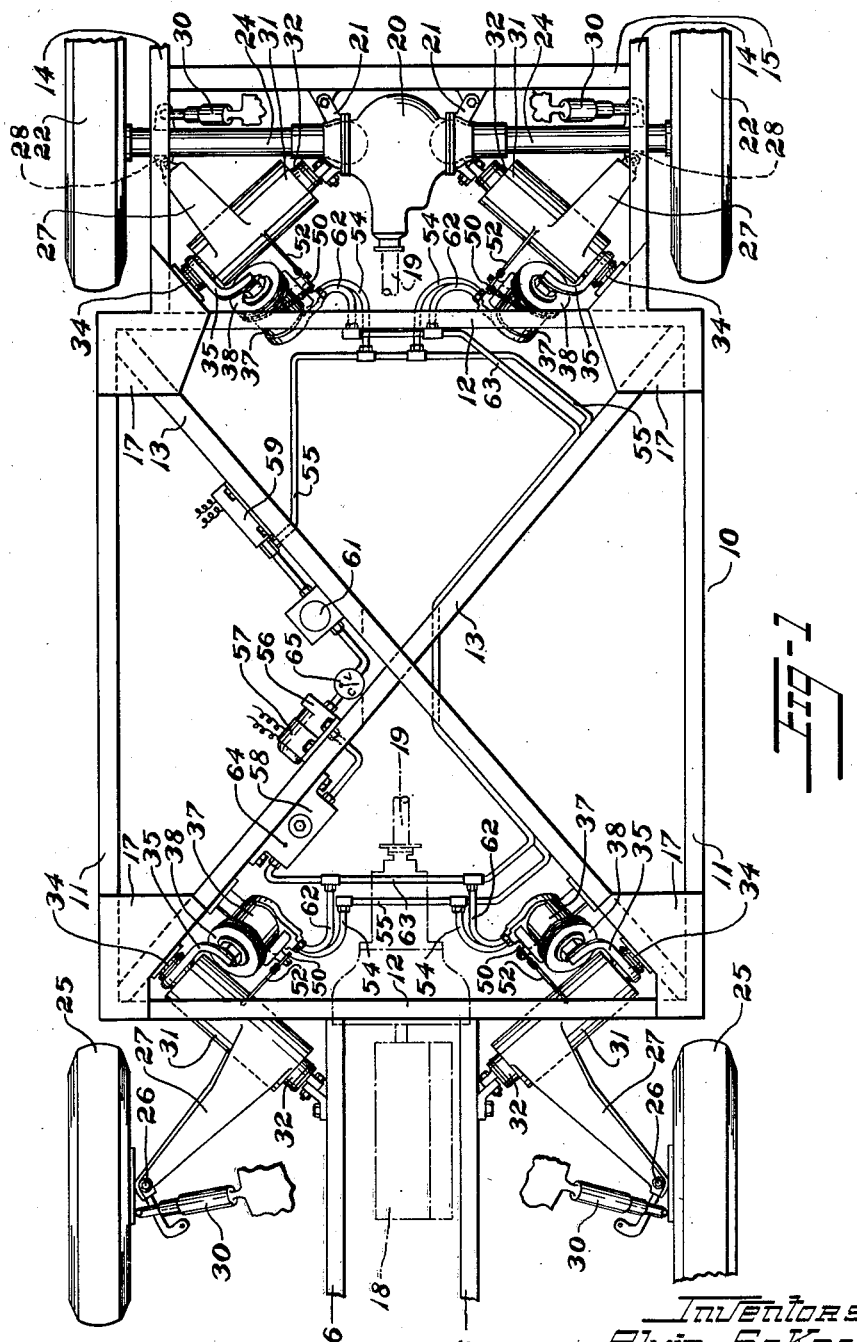
Inventors
Alvin S. Krotz
Robert C. Austin
By
Atty.

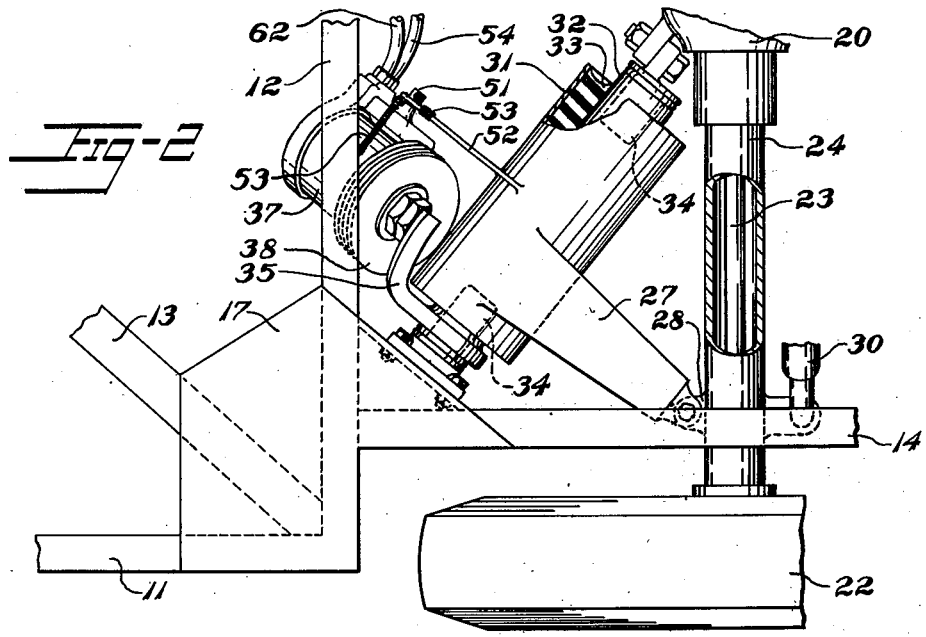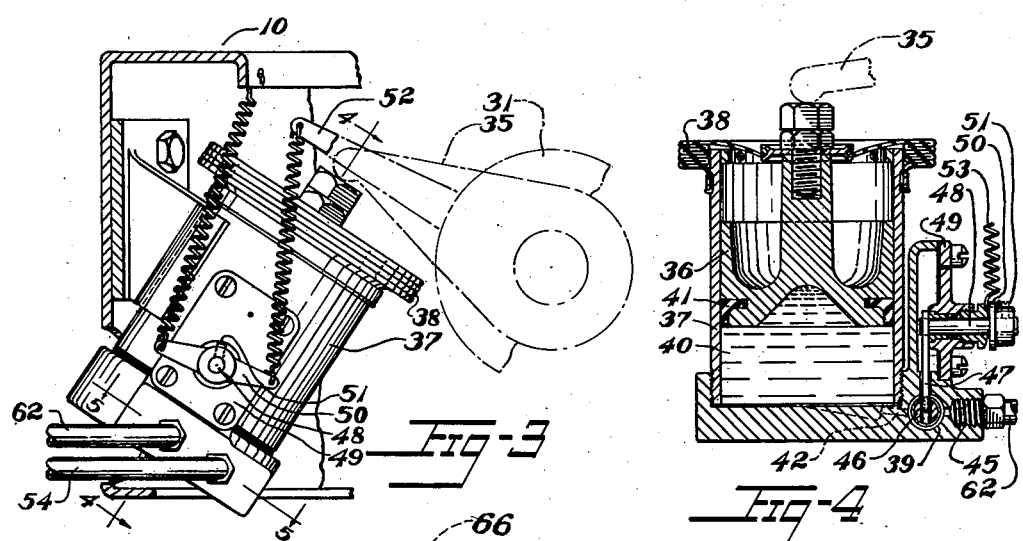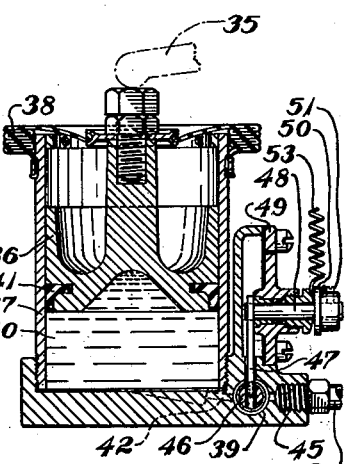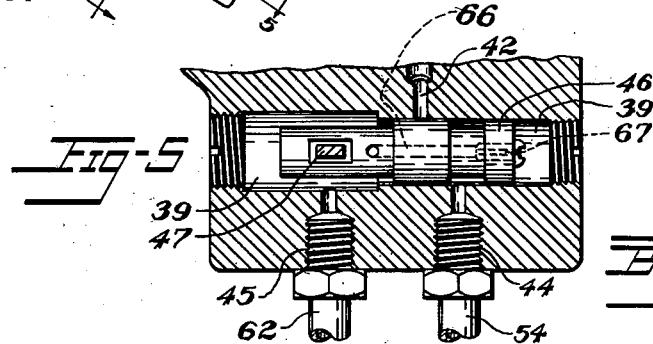

Dec. 18, 1951 — A. S. KROTZ ET AL — 2,579,084
CONSTANT LEVEL VEHICLE SUSPENSION
Filed July 8, 1946 — 3 Sheets-Sheet 3
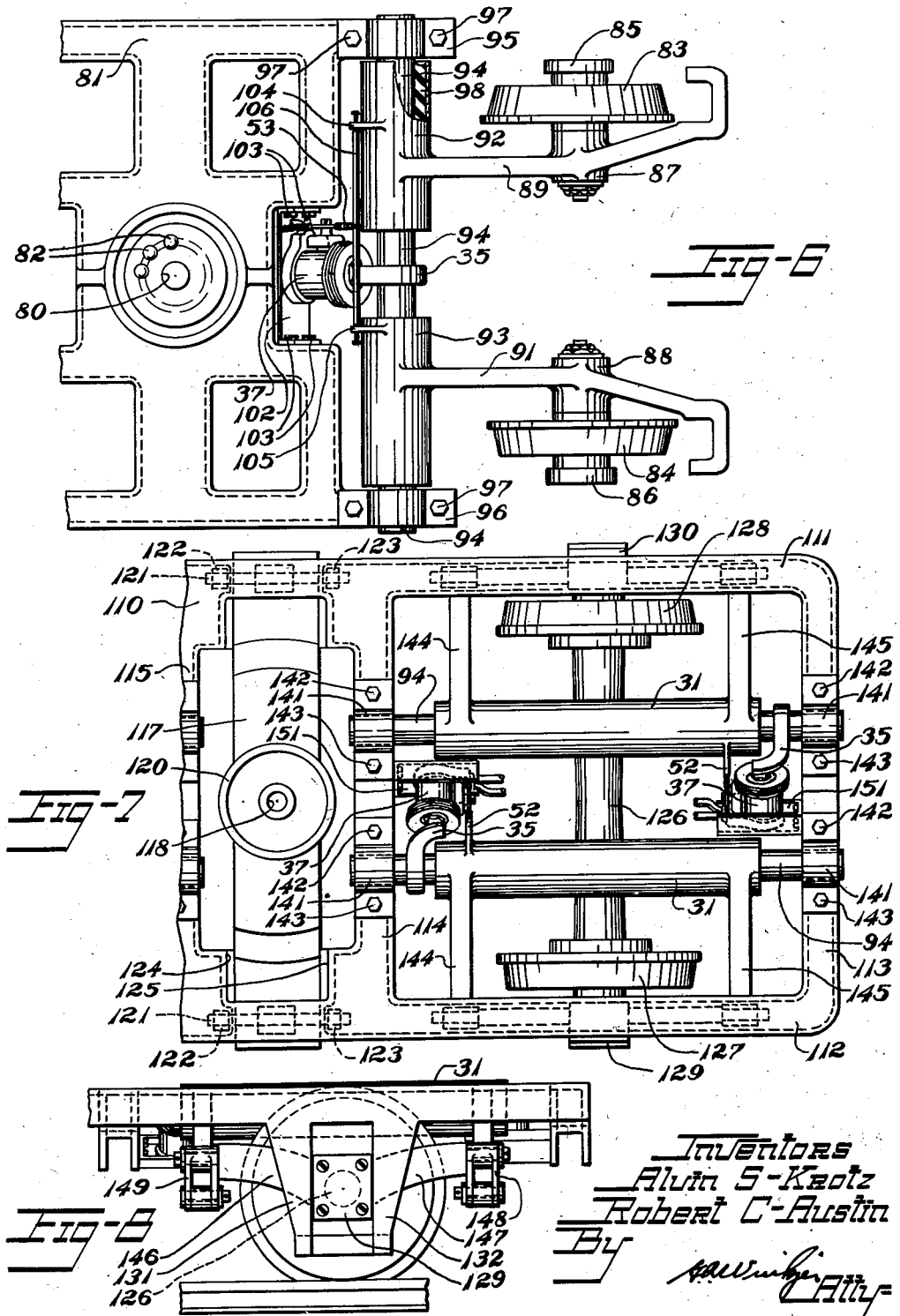
Inventors
Alvin S. Krotz
Robert C. Austin Patented Dec. 18, 1951

2,579,084

UNITED STATES PATENT OFFICE 2,579,084

CONSTANT LEVEL VEHICLE SUSPENSION

Alvin S. Krotz and Robert C. Austin, Akron, Ohio, assignors to The B. F. Goodrich Company, New York, N. Y., a corporation of New York Application July 8, 1946, Serial No. 682,062

1 Claim. (Cl. 267—21)

This invention relates to vehicle suspensions and especially to adjustments for the suspensions which maintain the vehicle body at a substantially constant level or height relative to the wheels despite changes in the loading of the vehicle.

Objects of the invention are to provide improved mechanism for maintaining a constant or substantially constant height of the vehicle body with respect to the wheels; to provide for hydraulic operation of such mechanism; to provide minimum weight and bulk of apparatus, interchangeability of units, flexibility of installation, a minimum of maintenance requirements, and convenience of installation and operation.

These and other objects will be apparent from the following description, reference being had to the accompanying drawings in which:

Fig. 1 is a plan view of a vehicle chassis including a suspension system constructed in accordance with and embodying the invention, parts being broken away.

Fig. 2 is an enlarged plan view of the left rear wheel mounting and suspension, parts being broken away.

Fig. 3 is a side elevation of a part of the height-adjusting mechanism, parts being broken away.

Fig. 4 is a section taken along the line 4—4 of Fig. 3.

Fig. 5 is a section taken along the line 5—5 of Fig. 3.

Fig. 6 is a plan view of a railroad truck including a suspension system constructed in accordance with and embodying the invention, parts being broken away.

Fig. 7 is a view like Fig. 6 but showing a modified construction.

Fig. 8 is a side elevation of the railroad truck shown in Fig. 7, parts being broken away.

In the illustrated embodiment shown in Fig. 1 to Fig. 5 the invention is applied to an independent suspension of a type described more fully and claimed in the copending application of Alvin S. Krotz, Serial No. 591,215, filed April 30, 1945, now Patent No. 2,555,649, issued June 5, 1951. In said prior application there is disclosed a supporting structure or frame which is utilized also in the embodiment of Figs. 1 to 5 of the present application in which the frame is designated 10. This frame has longitudinal members 11 connected by transverse members 12 and by intersecting cross members 13. Mounted on the rear transverse member 12 are longitudinal members 14 connected by another transverse member 15. Longitudinal engine supporting members 16 are mounted on the forward transverse member 12. Gussets 17 are mounted at the intersections of the transverse and longitudinal members 11 and 12, to reinforce the frame structure.

An engine 18 shown in dotted lines in Fig. 1 supplies the power to drive the vehicle and is mounted on the supporting members 16 of the frame 10. The power is transmitted by a drive shaft 19 to a differential gear unit 20 which is mounted on the rearmost transverse member by brackets 21. Rear wheels 22 propel the vehicle and are driven by axles 23 mounted swingably in the differential gear unit 20 and increased in housings 24. The vehicle is steered by the front wheels 25 which are mounted on king pins 26 about which they may turn in a horizontal plane.

Springing and support of the vehicle is provided by independent spring suspensions including rubber springs operating in torsion. Supporting arms 27 connecting the wheel assemblies and the spring suspensions are mounted on the rear shaft housing 24 at mounting lugs 28 and on the front wheel assemblies 25 about the king pins 26. The other end of each arm 27 is mounted on an outer sleeve element 31 of the spring which is disposed with its axis diagonal to the longitudinal axis of the vehicle. An inner hollow shaft element 32 is disposed within the sleeve 31 and a body of resilient rubber-like material 33 is mounted between the shaft 32 and sleeve 31, preferably adhered to both by vulcanization and provides springing of the vehicle through transmission of supported load by the torsional stress of the rubber-like material 33. The inner shafts 32 are mounted rotatably on the frame 10 at the rear wheels 22 on coaxial stub shafts 34 projecting from the gussets 17 and from the differential gear unit 20 and at the front wheels 25 on coaxial stub shafts 34 projecting from the cross frame members 13 and from the engine supporting frame members 16. Shock-absorbing units 30 may be mounted on the front wheel assemblies 25 and on the rear shaft housings 24 and connected to the frame 10.

In accordance with the present invention, when the vehicle rests upon the wheels, an arm 35 contacts fluid-pressure means comprising a piston 36 slidably mounted in a supporting body or cylinder 37 closed at one end. The piston 36 is moved by injection or ejection of a fluid 40, preferably of a relatively incompressible type and having antifreeze and lubricating properties, at the closed end of the cylinder 37 by way of an aperture 42 in said closed end. The piston is provided with an annular seal 41 and preferably a bellows covering 38 mounted between the piston 36 and the cylinder edge. A valve housing having a valve chamber 39 is mounted on the cylinder 37 for regulating the amount of fluid 40 in the cylinder 37. The valve housing comprises a chamber 39 connected by a passage to the cylinder aperture 42 and having inlet and outlet apertures 44 and 45. A movable valve piston 46 is mounted in the chamber and directs the fluid 40 from the inlet aperture 44 to the cylinder aperture 42 or directs the fluid 40 from the cylinder aperture 42 to the outlet aperture 45. The valve piston 46 has a flow restricting passage 66 connecting the spaces in the valve chamber 39 at the ends of the piston 46 to provide a delaying action of the valve piston. The valve piston 46 is slotted to accommodate a lever arm 47 which is mounted on a pin 48 which is mounted in a plate 49 fastened to the valve by bolts. A control arm 50 is mounted on the pin 48 and secured by a set screw 51 for adjustment thereon. The control arm 50 is connected by resilient members such as coil springs 53 to the frame 10 and to an arm 52 mounted on the outer sleeve 31 so that the relative movement of the wheels 22 and 25 with respect to the frame 10 will be transmitted to the control arm 50.

The inlet apertures 44 of the valves for the wheels are supplied by conduits 54 connected to a high pressure fluid conduit 55. The fluid pressure in the conduit 55 is maintained by a pump 56 which in this embodiment is driven by an electric motor 57. However, an engine driven pump or pump driven by other means may be used if desired. The pump 56 may be mounted at substantially any position on the frame 10 or body of the vehicle and is mounted in Fig. 1 on the cross members 13 of the frame. The fluid is supplied to the pump 56 from a reservoir 58 mounted on the cross members 13. A pressure regulator valve 59 may be connected to the high pressure conduit 55 and mounted on the cross members 13 for automatically closing the electric circuit which transmits power to the pump-motor 57 when the pressure in the conduit 55 falls below the desired value and for opening the circuit when the pump 56 causes the pressure to return to the desired value. An accumulator 61 preferably is also connected to the high pressure conduit 55 and mounted on the cross members 13 for acting as a cushion to absorb any erratic fluctuations in pressure in the conduit 55 and for supplying small quantities of fluid 40 under pressure so that the pump operation will not be required for such demands and the frequency of pump operation will be reduced.

The outlet apertures 45 of the valves are connected by conduits 62 to a low pressure fluid conduit 63 from the cylinders 37 to the reservoir 58. A vent 64 in the reservoir 58 provides an opening to the atmosphere for the low pressure side of the hydraulic system. A one-way valve 65 is interposed in the conduit between the pump 56 and the accumulator 61 to limit the flow of the fluid 40 to one direction.

The operation of the system is as follows: Assuming the positions of the parts as shown in Fig. 3 and Fig. 5 to be the positions for the normally desired height of the vehicle frame 10 with respect to the wheels, if now the load on the vehicle is materially increased the frame 10 will be caused to descend with respect to the wheels, whereupon the arm 52 which is mounted on the outer sleeve will descend and the coil spring 53 connecting the arm 52 and the control arm 50 will be subjected to less stress in tension than is the coil spring 53 connecting the frame member 12 and the arm 52. The unequal forces on the springs 53 will tend to turn the arm 50 as shown in Fig. 3 in a clockwise direction which will move the shaft 48 and lever arm 47 in a clockwise direction. The lever arm 47 will cause the valve piston 46 as shown in Fig. 5 to move to the left and open the inlet aperture 44 admitting pressure fluid 40 to the valve chamber 39 and to the cylinder aperture 42 which will conduct the fluid to the cylinder 37 and cause the piston 36 to rise and thereby move the adjusting arm 35 upwards, causing the wheel to be lowered and the chassis to rise. As the adjusting arm 35 ascends the inner shaft 32 will be rotated causing the outer sleeve 31 to rotate and move the arm 52 upwards whereupon the coil spring 53 connecting the arm 52 and the control arm will be subjected to a greater stress in tension than the coil spring 53 connecting the frame member 12 and the arm 52. The unequal forces on the springs 53 will tend to turn the arm 50 as shown in Fig. 3 in a counter-clockwise direction which will move the shaft 48 and lever arm 47 in a counter-clockwise direction. The lever arm 47 will cause the valve piston 46, as shown in Fig. 5, to move to the right and close the inlet aperture 44 preventing any flow of the fluid 40 to or from the cylinder 37, when the relative height of the frame 10 with respect to the wheels reaches the normally desired value.

When the load is increased momentarily such as might be caused by a bump in the road the action of the valve piston 46 will be retarded sufficiently so that a change in level will not occur. Low pressure fluid is present in the valve chamber 39 and in the passage 66 at all times and in order to move the piston 46 fluid must be displaced. The spring 53 will tend to rotate the arm 50 in a clockwise direction when the momentary load is applied as by a bump the same as when an actual load is applied. As the valve piston 46 is moved to the left a vacuum will tend to form in the chamber 39 space at the right end of the piston 46 and fluid 40 will be drawn through the passage 66 from the valve chamber 39 space at the left end of the piston 46 to the space at the right end of the piston 46. This retards the movement of the piston to the left and if the motion to the left is so slow that the wheel assembly returns to the normal position with respect to the frame before the piston moves sufficiently to open the cylinder aperture 42 to the inlet aperture 45 no change in fluid content in the cylinder 37 will result and there will be no operation of the level adjusting mechanism.

If the vehicle body is raised with respect to the wheels, as because of a decrease in the load, the arm 52 mounted on the outside bushing 31 will be raised causing the spring 53 connecting the arm 52 and the control arm 50 to be subjected to greater stress than the spring 53 connecting the frame 10 and the control arm 50 whereupon the springs 53 will tend to equalize the stresses upon them and turn the control arm 50 in a counter-clockwise direction as seen in Fig. 3 which will move shaft 48 and lever arm 47 in a counter-clockwise direction. The lever arm 47 will cause the valve piston 46 as shown in Fig. 5 to move to the right and open the outlet aperture 45 to the cylinder aperture 42 permitting fluid 40 beneath the piston 36 to escape and allow the piston 36 to descend and thereby permit the adjusting arm 35 to descend. The descent of the adjusting arm 35 permits the inner shaft to rotate causing the outer sleeve to rotate likewise and move the arm 52 downward whereupon the coil spring 53 connecting the arm 52 and the control arm 50 will be stressed to a lesser degree than the other spring 53 and the springs 53 will tend to equalize the forces imposed on each spring causing the arm 50 as shown in Fig. 3 to move in a clockwise direction which moves the shaft 48 and lever arm 47 in a clockwise direction. The lever arm will cause the valve piston as shown in Fig. 5 to move to the left and close the cylinder aperture 42 preventing flow of the fluid 40 to or from the cylinder when the height of the vehicle frame 10 with respect to the wheels is that normally desired. When the load is decreased momentarily such as might be caused by a bump in the road the action of the valve piston 46 will be similar to that described hereinbefore for the case when the load is momentarily increased. The piston is moved to the right however as shown in Fig. 5 and the fluid in the chamber-space at the right end of the piston 46 will be subjected to compression causing the fluid to pass through the passage 66 to the chamber space at the left end of the valve chamber 39. This retards the movement of the piston 46 and if the movement is so slow that the wheel assembly returns to the normal position with respect to the frame before the piston moves sufficiently to open the cylinder aperture 42 to the outlet aperture 44 no change in fluid content in the cylinder 37 will result and there will be no operation of the level adjusting mechanism. The rate of flow of the fluid through the piston passage 66 therefore provides a time lag between the time when the relative position of the wheels with respect to the frame changes and the time when the adjusting arm 35 will be actuated. A fluid flow restricting element 67 having an orifice of desired size may be inserted in the passage 66 to give the rate of flow desired. The initial tension of springs 53 will also affect the time lag. By regulating tension of the springs 53 and the orifice size in the restricting element 67 a range of sensitivity to the changes in relative position of the frame and wheels may be obtained to the end that level change will not be effected under ordinary springing movements but will be effected under change of load.

In the embodiment of the invention shown in Fig. 6 a truck and wheel suspension for a railroad vehicle is shown. A king pin 80 and ball bearings 82 disposed about the pin 80 mounted on a frame 81 provide means for supporting the load of the vehicle and for rotatably pivoting the truck with respect to the vehicle body about a vertical axis. Wheels 83, 84 are mounted on stub axles 85, 86 which are mounted rotatably in journals 87, 88 which are mounted in supporting arms 89, 91. The supporting arms 89, 91 extend longitudinally from the end of the truck and outwardly from the journals 87, 88. The arms 89, 91 are mounted on outer elements such as sleeves 92, 93 extending crosswise of the truck. An inner element such as a shaft 94 extends through the bushings 92, 93 and is mounted rotatably in half round seats formed on the frame 81 and covered by cap members 95, 96 secured to the frame 81 by bolts 97. A resilient body 98 of rubber or other rubber-like material is mounted between each sleeve 92, 93 and the shaft 94 for resiliently cushioning and transmitting the load from the frame 81 to the axles 85, 86.

The shaft 94 is prevented from turning by an adjusting arm 35 mounted on the shaft 94 and seated upon a piston 36 of a hydraulic cylinder 37 similar to that described hereinabove with reference to Fig. 4. The cylinder 37 is mounted on a bracket 102 which is secured to the frame 81 by bolts 103. Outwardly projecting lugs 104, 105 mounted on each bushing 92, 93 are connected by a control rod 106 extending through the lugs 104 and 105. Flexible members such as coil springs 53 connect the rod 106 to the control arm 50 and the arm 50 to the frame 81. The fluid 40 under pressure necessary to move the piston 36 is provided by a hydraulic system similar to that shown in Fig. 1 and hereinbefore described. Electric power may be supplied by the vehicle generator.

Wheels and suspensions similar to those described on one end of the truck are mounted similarly on the other end. The height-adjusting apparatus is also duplicated and may be connected hydraulically to the apparatus shown.

The operation of the height adjusting apparatus for the vehicle shown in Fig. 6 will be the same as the operation of the height-adjusting apparatus shown in Fig. 1, Fig. 3, Fig. 4, and Fig. 5 and described hereinbefore, with the exceptions that the outer sleeves 92 and 93 in Fig. 6 are substituted for outer sleeves 31 in Fig. 1, the shaft 94 is substituted for inner shaft 32 in Fig. 1 and the control rod 106 connecting lugs 104 and 105 is substituted for arm 52 in Fig. 1.

Referring to Fig. 7 another embodiment of the invention as applied to railroad trucks is shown. A truck frame 110 comprises a pair of side frames 111, 112 connected to each other by cross members 113, 114, and 115. For supporting the load of the vehicle from the frame 110, a bolster 117 is provided extending crosswise of the truck and has a king pin aperture 118 for receiving a king pin, and a counter bearing 120 thereabout for rotatably pivoting the truck with respect to the vehicle body about a vertical axis. The bolster is suspended from the frame 110 by stirrup bars 121 extending thereunder and pivotally to the frame by links 122, 123. Suitable guides 124, 125 on the frame 110 prevent fore and aft movement of the bolster with respect to the frame but permit movement of the bolster crosswise of the truck. Wheels 127, 128 are fixed to an axle 126 at one end of the truck and similar wheels are fixed to a similar axle at the other end thereof.

For guiding the journal boxes 129, 130 within which the axle 126 is rotatably journaled, the frame members 111, 112 are formed with depending pedestals such as 131, 132 at an axle position. These confine the journal boxes 129, 130 but permit vertical movement thereof. Similar members confine the boxes 129, 130 about the other axle.

For resiliently cushioning and transmitting the load from the frame 110 to the axles, rubber springs operating in torsion are provided. Each spring structure has an outer element such as a sleeve 31, an inner element such as a shaft 94 of greater length extending therethrough in the longitudinal direction of the truck, and a resilient body 33 of rubber or other rubber-like material between the sleeve 31 and the shaft 94 and fixed to the sleeve 31 at its outer surface and to the shaft 94 at its inner surface as by a bond of vulcanization. The shafts 94 are mounted rotatably in half-round seats formed on the cross members of the frame, as by cap members 141 held by bolts 142, 143.

Each sleeve 31 has a pair of parallel arms 144, 145 fixed thereto and extending substantially horizontally toward the sides of the truck. Arms 144, 145 are pivotally secured to yoke arms 146, 147 of a journal box 129 by links 148, 149. The arrangement is such that the load on the frame 110 is transmitted through the arms of the four springs to the journal boxes 129 in which the axles rotate.

Height-adjusting apparatus which is adapted to this truck suspension is similar to that included in the embodiment shown in Fig. 6. Each shaft 94 has an adjusting arm 35 mounted on one end with the arms 35 seated upon a piston 36 of a hydraulic cylinder 37 similar to that described heretofore and shown in Fig. 4. The cylinders 37 are mounted on brackets 151 secured to the frame members 113, 114. Outwardly projecting lugs 52 on each sleeve are connected to the control arms 50 of the cylinder valve by flexible members such as coil springs 53. The control arms 50 are also connected with the frame members 113, 114 respectively by the spring members 53. The fluid 40 under pressure necessary to move the piston 36 is provided by a hydraulic system similar to that shown in Fig. 1 and hereinbefore described. Similar suspensions are mounted on the other end of the frame. The operation of the height-adjusting apparatus for the vehicle shown in Fig. 7 will also be the same as the operation of the height-adjusting apparatus shown in Fig. 1, Fig. 3, Fig. 4, and Fig. 5, and described hereinbefore with the exception that the shaft 94 is substituted for inner shaft 32 shown in Fig. 1.

Variations may be made without departing from the scope of the invention as it is defined in the following claim.

We claim:

An individual wheel suspension for a vehicle having a plurality of spaced-apart wheels and a frame, said suspension comprising a wheel assembly, an inner shaft mounted for rotative adjustment on said frame and an outer sleeve disposed around said shaft for relative turning movement about said shaft, said sleeve having an outwardly extending suporting arm mounted on said wheel assembly for swinging movement of said wheel assembly and said sleeve about said shaft, a body of resilient rubber-like material between said shaft and said sleeve for cushioning relative movement of said sleeve and swinging movement of said wheel assembly about said shaft, a control arm extending outwardly from said sleeve to a position adjacent said frame in the proximity of said wheel assembly, an adjusting arm extending outwardly from said shaft for turning the shaft relative to said frame, fluid pressure actuating means mounted on said frame comprising a cylinder, a piston in reciprocable engagement with said cylinder, said piston being in direct contact with said adjusting arm for turning said shaft relative to said frame in response to changes in fluid content of said cylinder, a source of pressure fluid for supplying fluid to said cylinder, means for regulating the flow of pressure-fluid from said source to said cylinder comprising a valve having a housing with a chamber connected by apertures to said cylinder and to said source of pressure fluid, a valve piston in reciprocable engagement with said chamber for opening and closing said apertures and said valve piston having a restricted aperture disposed axially thereof for restricting the rate of movement of said valve piston and delaying controlling movement of said valve to prevent response thereof to springing movement of said wheel assembly within the interval of delay and resilient connecting means extending from said valve to said control arm and to said frame in the proximity of said wheel asembly for transmitting indications of relative movement of the portion of said frame in the proximity of said wheel assembly to said valve piston for maintaining a substantially constant height of the vehicle frame in the proximity of said wheel assembly at different conditions of loading.

ALVIN S. KROTZ.
ROBERT C. AUSTIN.

REFERENCES CITED

The following references are of record in the file of this patent:

UNITED STATES PATENTS

| Number | Name | Date |
|---|---|---|
| 1,664,510 | Hughes | Apr. 3, 1928 |
| 2,021,043 | Bedford et al. | Nov. 12, 1935 |
| 2,150,576 | Bell | Mar. 14, 1939 |
| 2,191,211 | Krotz | Feb. 20, 1040 |
| 2,253,042 | Muchnic | Aug. 19, 1941 |
| 2,345,201 | Krotz | Mar. 28, 1944 |
| 2,436,681 | Swenson | Feb. 24, 1948 |

FOREIGN PATENTS

| Number | Country | Date |
|---|---|---|
| 810,850 | France | Jan. 6, 1937 |